US005642494A

United States Patent [19]
Wang et al.

[11] Patent Number: 5,642,494
[45] Date of Patent: Jun. 24, 1997

[54] CACHE MEMORY WITH REDUCED REQUEST-BLOCKING

[75] Inventors: Wen-Hann Wang; John M. Bauer, both of Portland, Oreg.

[73] Assignee: Intel Corporation, Santa Clara, Calif.

[21] Appl. No.: 360,328

[22] Filed: Dec. 21, 1994

[51] Int. Cl.$^6$ ........................................... G06F 12/00
[52] U.S. Cl. ..................... 395/467; 395/468; 395/481
[58] Field of Search ................................ 395/467, 468, 395/445, 481, 470

[56] References Cited

U.S. PATENT DOCUMENTS

| | | | |
|---|---|---|---|
| 4,794,521 | 12/1988 | Ziegler et al. | 395/457 |
| 5,434,993 | 7/1995 | Liencres et al. | 395/470 |

FOREIGN PATENT DOCUMENTS

| | | |
|---|---|---|
| 0213694 | 3/1987 | European Pat. Off. |
| 0568231 | 11/1993 | European Pat. Off. |
| 2230120 | 10/1990 | United Kingdom. |

OTHER PUBLICATIONS

Val Popescu, et al., "The Metaflow Architecture", IEEE Micro, Jun. 1991, pp. 10–13 and 63–73.

*Primary Examiner*—David L. Robertson
*Attorney, Agent, or Firm*—Blakely, Sokoloff, Taylor & Zafman

[57] ABSTRACT

A cache memory with reduced request-blocking blocks requests from being accepted by the cache memory based on the types of requests the cache is already servicing. A request which hits the cache memory or a request which misses the cache memory but does not conflict with any requests already being serviced is not blocked. A request which misses the cache memory and also conflicts with a request(s) already being serviced causes the request to be blocked. In one embodiment, conflicts for write requests are determined by checking whether the cache is already retrieving a cache line from system memory for a request which maps into the same cache set as the write request. If such a request exists, then a conflict occurs. In this embodiment, conflicts for read requests are determined by checking whether the cache is already servicing an outstanding request to memory for the same address. If so, then a conflict occurs. If not, then a conflict does not occur unless the victim line for the read request is dirty and no space exists in a write-back buffer to temporarily store the victim line.

23 Claims, 7 Drawing Sheets

CACHE MEMORY WITH REDUCED REQUEST-BLOCKING

BACKGROUND OF THE INVENTION

1. Field of the Invention

The present invention pertains to the field of computers. More particularly, this invention relates to cache memory systems used in computing systems.

2. Background

Computer technology is continuously advancing, resulting in microprocessors which operate at faster and faster speeds. In order to take full advantage of these higher-speed microprocessors, data storage capabilities must keep up with the increased speed. High-speed memory, however, is very expensive, with the cost being further amplified by the large amount of memory which many modern software programs require.

One solution to the problem of expensive memory is that of a cache memory subsystem. A cache memory subsystem is a memory unit which is generally much smaller than the system memory unit but which operates at a significantly higher speed than the system memory. The goal of the cache memory is to contain the information (whether it be data or instructions) that the microprocessor is going to use next. This information can then be returned to the microprocessor much more quickly, due to the higher speed of the cache memory.

The cache memory is typically much smaller than the system memory, thus, only a portion of the memory address is used to determine which location in the cache memory information should be placed in. This portion is referred to as the "index." A second portion of the memory address, generally referred to as the "tag portion," is then used to determine whether subsequent requests for information which match that particular location are for the data currently stored in that location. Therefore, multiple system memory addresses reference the same location in the cache memory.

The operation of cache memory subsystems varies, however, in general data is swapped between the system memory and the cache memory. When the microprocessor requests information from memory, for example, either an instruction it is going to execute or data related to an instruction, it sends the memory address of the desired information to the cache memory. If the cache memory contains the information, it issues a signal to the microprocessor indicating so; this signal is generally termed a "hit." The cache memory then returns the requested information to the microprocessor. Thus, the microprocessor receives the requested information more quickly due to the faster speed of the cache memory.

If, however, the cache memory does not contain the information requested by the microprocessor, then a signal, generally termed a "miss," is returned to the microprocessor. The miss indicates to the microprocessor that it must retrieve the information from the slower system memory. Alternatively, the cache memory controller may retrieve the information from the system memory, and return it to the microprocessor.

Regardless of whether the microprocessor or the cache controller retrieves the information from the system memory, the retrieved information is returned to the microprocessor and is also stored in the cache memory. When the microprocessor requests a memory address which corresponds to a location in the cache memory which is already used by another cache line, then a conflict occurs. In some systems, this situation is resolved by transferring the information stored in a particular location of the cache memory into system memory and transferring the information stored in system memory into that particular location of the cache memory.

Whether the cache memory must transfer the information to the system memory when a conflict occurs is also dependent on the cache policy employed. For example, some cache policies (generally referred to as "write-through" policies) transfer the information to the system memory whenever the information in the cache is updated. Thus, when retrieving new information from the system memory, information in the cache need not be transferred to the system memory. Other cache policies (generally referred to as "write-back" policies), however, transfer cache lines to the system memory only when a cache line conflict occurs and the cache line has been modified (generally referred to as being "dirty").

Regardless of whether the cache memory must transfer information in a particular location to the system memory in the event of a cache miss, information from the system memory is transferred to the cache memory. The retrieval of information from the system memory into the cache memory is typically referred to as "fetching" the information. This fetching of information from the system memory is a slow operation relative to the speed of the processor, due to the slower speed of the system memory as well as the speed of the system bus. Thus, this speed difference can result in situations where the processor issues additional requests to the cache memory while the cache memory is in the process of fetching information from the system memory.

When the cache memory is fetching information from the system memory, care must be taken to ensure that cache integrity is maintained. For example, if the processor issues a read request for memory address A which misses the cache memory, then the cache memory begins the process of fetching the information at address A from system memory. However, the processor may then issue a second request for memory address B before the cache memory has completed the fetch of address A from system memory. Care must then be taken to ensure that, if address A and address B map into the same set, the cache memory does not return the wrong information to the processor for either request.

One method of ensuring the correct information is returned to the processor is to "block" all requests from the processor while the cache memory is fetching information from the system memory. That is, no requests from the processor are serviced by the cache memory until the information being fetched is actually stored in the cache memory. This method, however, causes a delay for the processor while it waits to be "unblocked." Due to the speed difference between the system memory and the processor, this can be a substantial delay.

Thus, it would be beneficial to provide a method of efficiently using a cache memory system to support a microprocessor.

It would further be beneficial to provide a cache memory system which reduces blocking of requests from a processor, while at the same time ensures the correct information is returned to the processor.

The present invention provides for these and other advantageous results.

SUMMARY OF THE INVENTION

A cache memory with reduced request-blocking is described herein. The cache memory blocks a request from being accepted by the cache memory based on the types of requests the cache is already servicing. A request which hits the cache memory or a request which misses the cache memory but does not conflict with any requests already being serviced is not blocked. A request which misses the cache memory and also conflicts with a request(s) already being serviced causes the request to be blocked.

In one embodiment, conflicts for write requests are determined by checking whether the cache is already retrieving a cache line from system memory for a request which maps into the same cache set as the write request. If such a request exists, then a conflict occurs. Conflicts for read requests are determined by checking whether the cache is already servicing an outstanding request to memory for the same address. If so, then a conflict occurs. If not, then a conflict does not occur unless the victim line for the read request is dirty and no space exists in a write-back buffer to temporarily store the victim line.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description numerous specific details are set forth in order to provide a thorough understanding of the present invention. However, it will be understood by those skilled in the art that the present invention may be practiced without these specific details. In other instances, well known methods, procedures, components, and circuits have not been described in detail so as not to obscure aspects of the present invention. It should be noted that the present invention can be applied to a variety of different processor architectures. Furthermore, the present invention can be practiced in a variety of manners, such as by a single or multiple chip implementation or by fabrication by silicon or gallium arsenide or other processes.

One Embodiment of the Memory Subsystem

Figure 1:
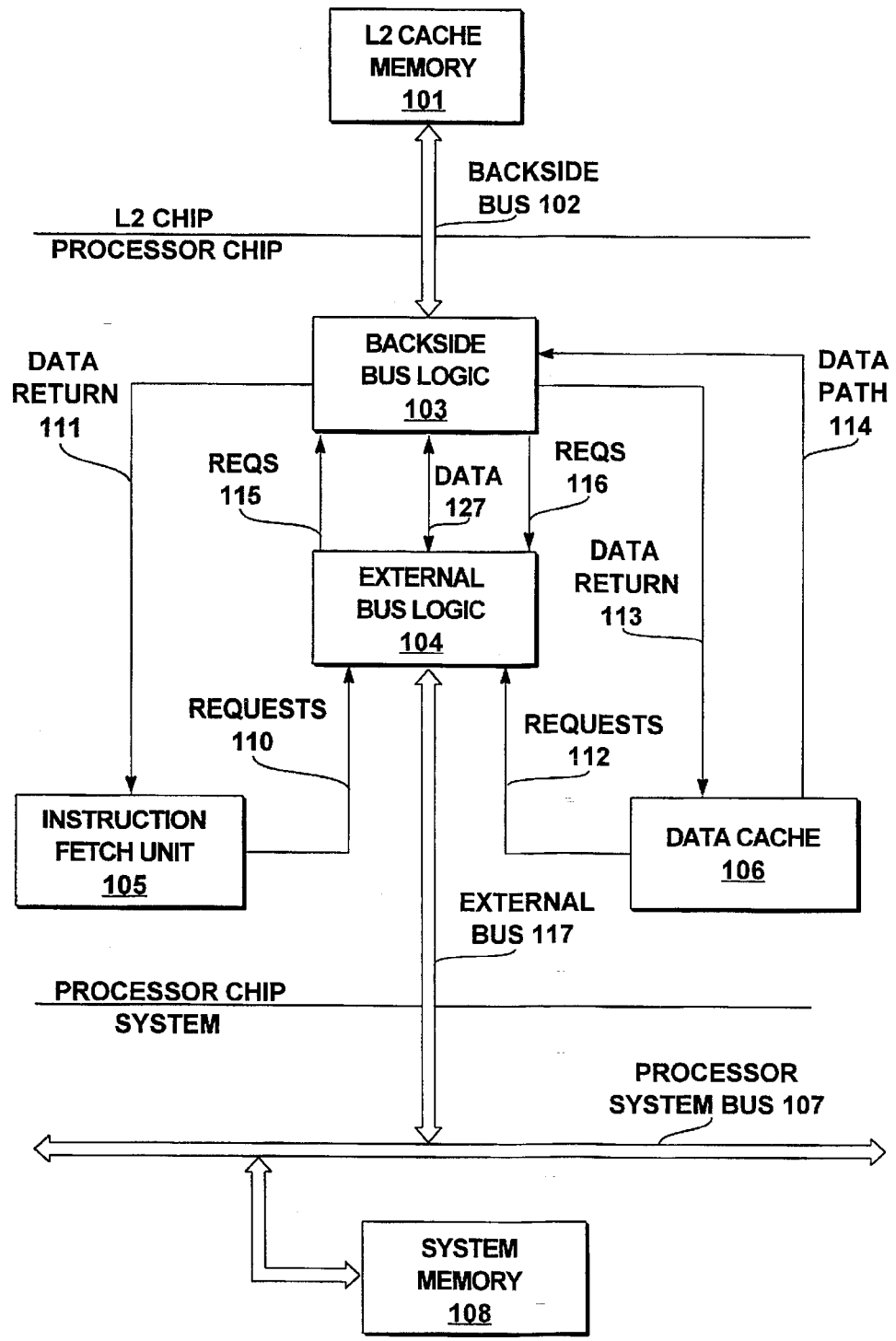
FIG. 1 is a block diagram of a memory subsystem of a computer system in one embodiment of the present invention.

FIG. 1 is a block diagram of a memory subsystem of the computer system in one embodiment of the present invention. Boundary lines are shown to define the portion of the memory subsystem that is contained within the processor and that portion which is external to the processor. Referring to FIG. 1, an L2 cache memory 101 is coupled to a backside bus 102. Backside bus 102 is also coupled to backside bus logic (BBL) 103. Backside bus logic 103 is also coupled to external bus logic (EBL) 104, instruction fetch unit (IFU) 105 and data cache unit (DCU) 106. External bus logic 104 is also coupled to instruction fetch unit 105, data cache 106 and system bus 107. Also shown coupled to system bus 107 is system memory 108.

Instruction fetch unit 105 includes instruction fetch logic and the instruction cache and fetches instructions for execution in the processor. When the instruction cache of IFU 105 desires to fetch more instructions, it sends a request on signal path 110 to external bus logic 104. The external bus logic 104 sends the request on request lines 115 to backside bus logic 103 which forwards the request to the L2 cache memory 101. In response, the L2 cache memory 101 performs a read operation. If there is a hit in L2 cache memory 101, the instructions are returned to instruction fetch unit 105 on the data return signal path 111 from backside bus logic 103 and backside bus 102.

The DCU 106 holds temporary copies of data for use by the processor in executing the instructions. In one embodiment, DCU 106 comprises an L1 cache memory. In executing instructions, if the data is not in the DCU 106 (that is, the L1 cache), a request is made on request signal path 112 to external bus logic 104. External bus logic 104 sends a request on request lines 115 to backside bus logic 103 which forwards the request on to L2 cache memory 101. If the data is in L2 cache memory 101 (that is, if L2 cache memory 101 hits), then the data is forwarded and returned to DCU 106 on data return signal path 113. When data is written back from DCU 106 or if there is no longer room in DCU 106, data is sent out to backside bus 102 via backside bus logic 103 to L2 cache memory 101.

Any time data from L2 cache memory 101 is to be written back to system memory 108, a request is made to external bus logic 104 via request lines 116 from backside bus logic 103. The data is written from backside bus 102 through backside bus logic 103 to external bus logic 104 via data path 127. External bus logic 104 controls the data by writing the data on external bus 117 to system memory 108 via system bus 107. Any time there is a miss to L2 cache memory 101, external bus logic 104 sends the request to system memory 108 using external bus 117 and system bus 107. The data returned is received by external bus logic 104 and sent to backside bus logic 103 via data path 127 for storage in L2 cache memory 101. The data is then written to DCU 106 via data return lines 113 and to L2 cache memory 101 via backside bus 102.

Processor accesses from the instruction fetch unit 105 are always fetch operations with no intent to modify the data. Similarly read operations from the data cache 106 that are generated by the processor executing a read operation are always data fetch operations. These requests are forwarded to system bus 107, if they miss the L2 cache memory 101, as read operations from the memory.

Backside bus logic 103 as shown in FIG. 1 is contained within the processor chip. In an alternate embodiment, BBL 103 is contained within the L2 chip, Thus, in this alternate embodiment, the control logic for the L2 cache is included in the L2 chip.

The External Bus Logic

Figure 2:
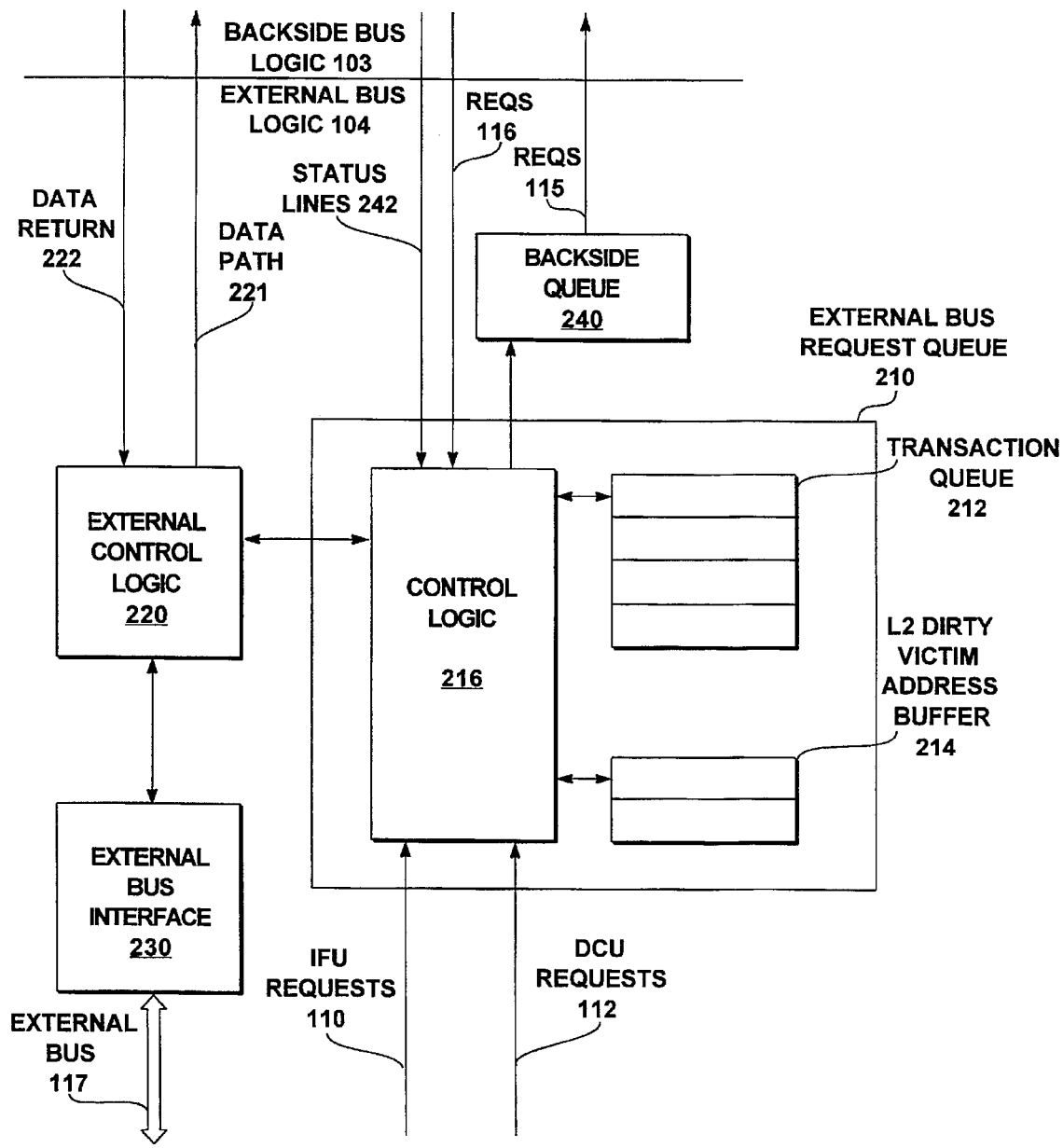
FIG. 2 is a block diagram showing external bus logic of a memory subsystem in one embodiment of the present invention.

FIG. 2 is a block diagram showing one embodiment of external bus logic 104 of FIG. 1 in more detail. EBL 104 includes external bus request queue 210, external control logic 220, external bus interface 230, and backside queue 240. External bus interface 230 contains the latches and necessary circuitry for interfacing between EBL 104 and system bus 107 via external bus 117.

External control logic 220 implements the system bus protocol which allows the processor to interface with other agents via system bus 107. External control logic 220 forwards requests from external bus request queue 210 to the system bus and also informs external bus request queue 210 of external request activity. In addition, external control logic 220 transfers requests between system bus 107 and BBL 103, via data path 221 and data return 222, and tracks the status of all outstanding requests on system bus 107.

In one embodiment of the present invention, external control logic 220 also includes error correcting and detecting logic as well as external snoop logic. The error correcting and detecting logic generates an Error Correcting Code (ECC) syndrome for outgoing data and parity for outgoing addresses and requests, and also checks parity on incoming address, request and response pins and ECC on incoming data pins. The external snoop logic controls all snoop requests, whether they be received from the system bus, IFU, DCU, or are self-generated. The external snoop logic issues snoop inquiries to the DCU, backside bus logic, and external bus request queue based on requests received from the backside bus logic and the system bus.

External bus request queue 210 is responsible for processing transaction requests from DCU 106 and IFU 105. It delivers to BBL 103 those requests that require service from L2 cache memory 101 and forwards those that L2 cache memory 101 cannot process successfully (that is, L2 cache misses) to the system bus.

EBL 104 also includes backside queue 240. In one embodiment of the present invention, backside queue 240 is a first-in first-out (FIFO) queue which queues transactions from external bus request queue 210 to BBL 103. In one implementation, backside queue 240 includes storage space for four transactions. In one embodiment of the present invention, requests are placed into backside queue 240 from external bus request queue 210 in three situations: (1) when they are accepted into queue 210 from IFU 105 or DCU 106; (2) when they are presented to and subsequently rejected by BBL 103; and (3) when they have received data from the system bus which is destined for L2 cache memory 101. These requests are then forwarded to BBL 103 via request lines 115. In this embodiment, requests are removed from backside queue 240 when they are presented to and acknowledged by BBL 103 via status lines 242. In one embodiment of the present invention, each queue entry in backside queue 240 includes the address of the request, the request type, and a unique identification tag for the request. Additional information may also be included, depending on the request type, such as request length, way, or state (for example, the well-known MESI state protocol).

External bus request queue 210 tracks the status of all requests from IFU 105 and DCU 106 from the moment they are accepted into EBL 104 until the final completion handshake back to the caches. In one embodiment, queue 210 includes a 4-entry transaction queue 212, a 2-entry L2 dirty victim address buffer 214, and control logic 216. Each entry in 4-entry transaction queue 212 contains the information necessary for tracking that transaction. In one implementation, this information includes the memory address of the transaction, error checking information, whether the transaction has been forwarded to BBL 103, the type of transaction, a unique identifier for the transaction, and whether the transaction has been responded to by system memory 108. Each entry in the 2-entry address buffer 214 contains the information necessary for transferring a dirty victim cache line back to system memory 108. In one implementation, this information includes the memory address of the transaction, error checking information, an indicator of whether the corresponding data is in read line buffer 340 of BBL 103, the state of the dirty victim line, and an indicator of the entry in transaction queue 212 which caused this dirty victim.

Control logic 216 is the control logic for interfacing external bus request queue 210 to the other components of EBL 104. In one embodiment of the present invention, control logic 216 indicates to BBL 103 whether certain requests should be rejected. As discussed in more detail below, control logic 216 compares the set or address information of a request received from IFU 105 or DCU 106 to currently outstanding requests in either transaction queue 212 and/or victim address buffer 214 to determine if a match exists. Control logic 216 indicates to BBL 103 that the request should be rejected based on whether a match is found.

The Backside Bus Logic

Figure 3:
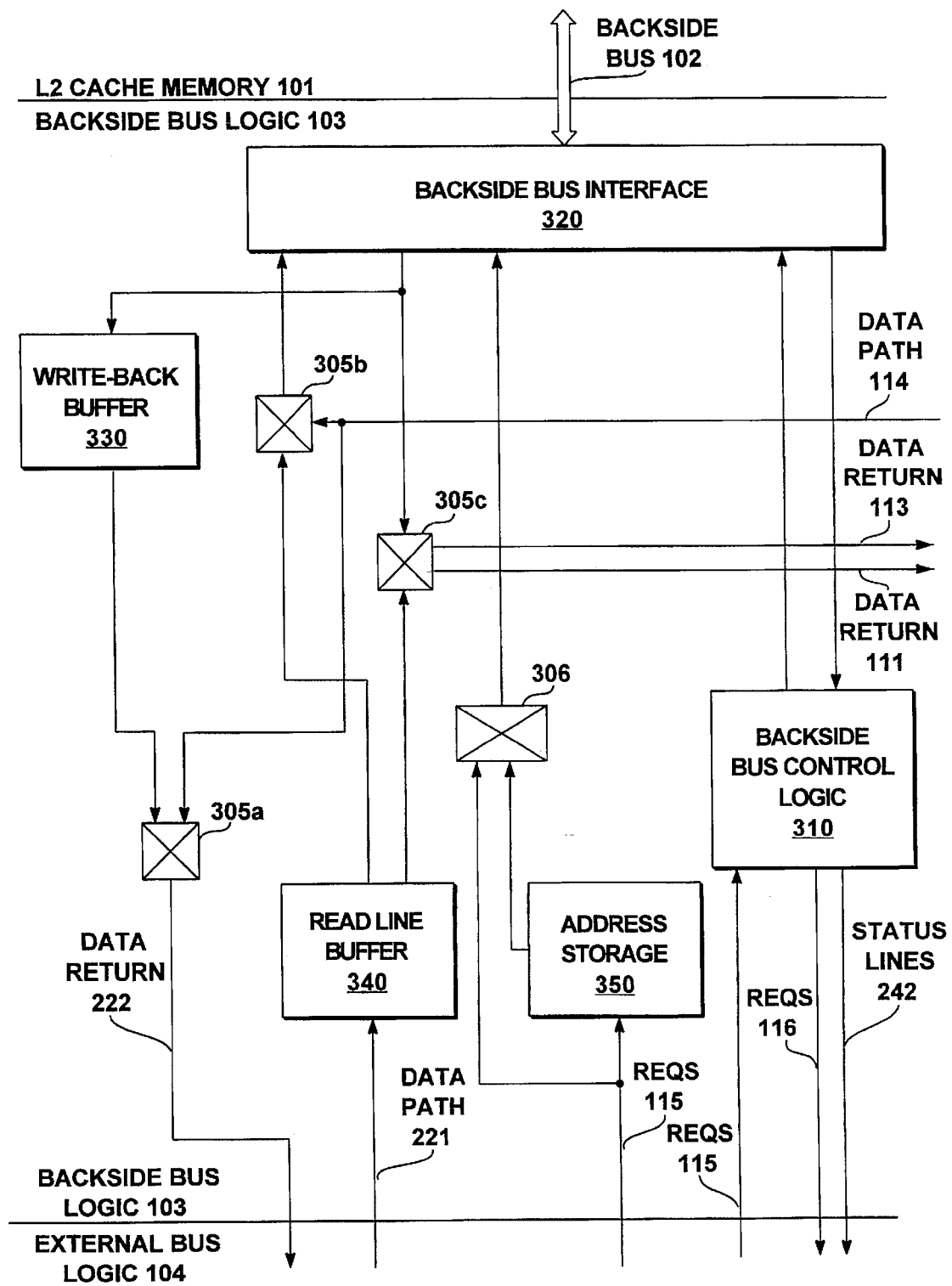
FIG. 3 is a block diagram showing backside bus logic of a memory subsystem in one embodiment of the present invention.

FIG. 3 is a block diagram showing one embodiment of backside bus logic 103 of FIG. 1 in more detail. BBL 103 includes backside bus control logic 310, backside bus interface 320, write-back buffer 330, and read line buffer 340. BBL 103 also includes multiple data multiplexers 305a, 305b, and 305c to route data between L2 cache memory 101, EBL 104, IFU 105, and DCU 106. Data can be routed to and from certain combinations of these units, depending on the action needed. BBL 103 also includes address multiplexer 306 which allows addresses to be transferred to L2 cache memory 101 either directly or via address storage 350.

Backside bus control logic 310 processes requests for L2 information received from EBL 104, and determines which L2 micro-operations are needed to carry out the desired action. These L2 micro-operations are discussed in more detail below.

Backside bus interface 320 provides an interface between BBL 103 and L2 cache memory 101. Backside bus interface 320 includes the latches and necessary circuitry for interfacing between BBL 103 and L2 cache memory 101.

Read line buffer 340 buffers data arriving from the external bus for return to IFU 105, DCU 106, or L2 cache memory 101 via data path 221. In one embodiment of the present invention, read line buffer 340 contains buffering space on a one-for-one basis for the entries in transaction queue 212 of EBL 104. In one implementation, read line buffer 340 contains buffering space for four cache lines. External bus request queue 210 keeps track of read line buffer 340 allocations through its own status bits, and is responsible for scheduling return of the data in read line buffer 340 to IFU 105, DCU 106, and L2 cache memory 101. In one embodiment of the present invention, external bus request queue 210 requests backside bus control logic 310 to write the read line buffer 340 contents back into L2 cache memory 101 once all outstanding chunks of data have returned from system memory 108.

Write-back buffer 330 stores dirty line(s) caused by L2 cache line victimization. The cache lines stored in write-back buffer 330 are destined for external memory writes and are returned to EBL 104 via data return lines 222. BBL 103 requests the cache lines stored in write-back buffer 330 to be returned to system memory 108 by issuing a request to EBL 104 via request lines 116. In one embodiment of the present invention, write-back buffer 330 stores cache lines on a one-for-one basis with entries in L2 dirty victim address buffer 214 of EBL 104. In one implementation, write-back buffer 330 contains storage space for two cache lines. Alternatively, write-back buffer 330 may contain storage space for additional cache lines or only a single cache line.

In one embodiment of the present invention, when a victimized cache line is transferred to write-back buffer 330, backside bus control logic 310 checks whether DCU 106 contains a modified cache line for the same address. If such a line does exist in DCU 106, then the cache line in DCU 106 will be more recently modified than the cache line in L2 cache memory 101. In one implementation, the cache line from DCU 106 is transferred to write-back buffer 330 for the writeback, overwriting the victimized cache line from L2 cache memory 101. In an alternate implementation, the writeback transaction is terminated. Thus the cache line is not written back to memory because DCU 106 contains the most recently modified version of the cache line.

Backside bus control logic 310 receives requests from external bus request queue 210 of EBL 104 via backside queue 240 and request lines 115. Control logic 310 responds to these requests to external bus request queue 210 via status lines 242. In one embodiment of the present invention, control logic 310 indicates that the request will either be serviced or is rejected. An indication that the request will be serviced informs EBL 104 that BBL 103 accepts the request and will perform as much of it as possible. Note that BBL 103 may not be able to perform the entire task immediately if, for example, it requires fetching a cache line from system memory 108. This indication also includes a signal indicating whether the request hit or missed L2 cache memory 101. If the request misses L2 cache memory 101, then a miss signal informs EBL 104 that the requested line must be fetched from system memory.

Backside bus control logic 310 may also reject the request. In this situation, EBL 104 re-tries the request; that is, the request is submitted to BBL 103 again at a later time. Thus, a rejected request is "blocked" by the cache memory until the current request is no longer rejected by BBL 103. Control logic 310 determines whether to reject a request based on multiple factors, depending on the request received. These factors include: (1) whether control logic 216 of EBL 104 indicates the request conflicts with an outstanding request; (2) whether the request hits L2 cache memory 101; and (3) whether a required victim cache line is dirty. These factors are discussed in more detail below with reference to FIGS. 6 and 7.

Additional control lines (not shown) are also couple together the various components within BBL 103. For example, control lines connect backside bus control logic 310 and multiplexers 305a, 305b, 305c and 306. These additional control lines have not been shown so as not to clutter the drawings and obscure the present invention. The necessary connections for these control lines will be apparent from the descriptions herein.

In one embodiment of the present invention, BBL 103 also includes address storage unit 350. Address storage unit 350 stores request addresses received from EBL 104 via backside queue 240 and request lines 115. These addresses may correspond, for example, to the data stored in read line buffer 340. Thus, when data is transferred into read line buffer 340, the corresponding address is transferred into address storage 350. In one implementation of the present invention, an identification value is stored with the address in address storage 350 and the data in read line buffer 340. In this implementation, control logic 310 can determine which data in read line buffer 340 matches which address in address storage 350 by comparing these identification values.

One Embodiment of the L2 Cache Memory

Figure 4:
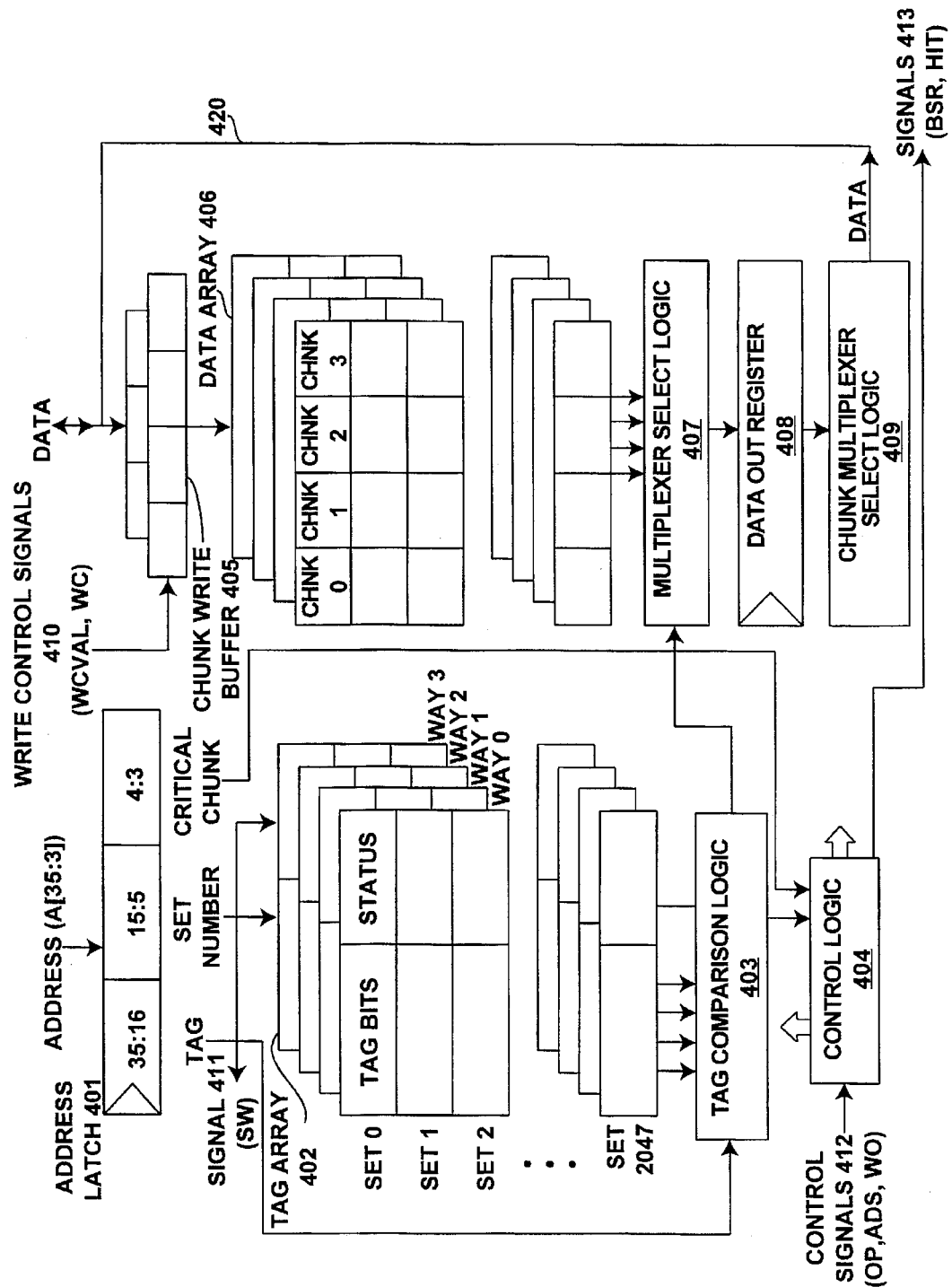
FIG. 4 is a block diagram of one embodiment of the L2 cache memory of the present invention.

A block diagram of one embodiment of L2 cache memory 101 is shown in FIG. 4. Referring to FIG. 4, L2 cache memory 101 includes address latch 401, tag array 402, tag comparison logic 403, control logic 404, chunk write buffer 405, data array 406, multiplexer (MUX) select 407, data output register 408, and chunk MUX select logic 409. Control logic 404 is coupled to components in L2 cache memory 101 to control their operation, partially in response to control signals 412 received on its inputs and signals by L2 cache memory 400. Control logic 404 also provides signals 413 to the processor.

The address latch 401 receives an address from bus 103. Bits [15:5] of the address select one of the sets in the tag array 402. The contents of the set are compared with bits [35:16] of the address in the comparison logic 403 and the result is used to select the appropriate way in the multiplexer select logic 407. Bits [4:3] of the address select which chunk of the data gets sent to the data bus 420, via the chunk multiplexer logic 409. The status signals from the tag array 402 are also returned to the processor via signals 413 and control logic 404.

In one embodiment, cache memory 101 is a 256 Kbyte four-way set associative cache, such that tag array 402 includes four separate ways (shown as way 0–3). In one implementation, tag array 402 includes 2048 sets, labeled set 0 to set 2047. In an alternate embodiment, cache memory 101 is a 512 Kbyte four-way set associative cache. In this alternate embodiment, tag array 402 includes 4096 sets, bits [16:5] of the address in address latch 201 select one of the sets in the tag array 402, and the contents of the set are compared with bits [35:17] of the address in the comparison logic 403.

Each set location in each way includes tag bits and status bits and additional parity bits. Two additional parity bits are included. The size of the tag is dependent on the size of the L2 cache memory. The status bits reflect the state of the L2 cache memory line: Modified, Exclusive, Share, or Invalid (MESI). These states are well-known to those skilled in the art.

It should be noted that the L2 cache memory regards the Modified/Exclusive/Shared states as valid, and does not distinguish between any of the valid states. In one embodiment of the present invention, the processor distinguishes between the valid states and, thus, implements the cache coherency protocol. That is, the processor of the present invention directly controls the status (MESI) of the stored data lines within the L2 cache memory, and the target associative way information on line writes. Each set of four tags corresponding to the cache lines in all four ways in the tag array contains one least recently used (LRU) field for determining victim line during a read miss. The L2 cache memory implements a pseudo-LRU algorithm for its line replacement policy. In one embodiment, tag array 402 includes an LRU array having an entry for each set in order to replace the least recently used lines in the L2 cache memory. Therefore, each set is associated with one LRU entry, four tag entries and four state entries.

The L2 cache memory supports data integrity through parity. The data integrity is intended to cover transmission errors on the backside bus and storage errors in tag array 402 and data array 406.

In one embodiment, data array 406 is a 288 Kbyte, 4-way set associative static random access memory (SRAM) that is logically organized as a 4×2K×288. The 288 bit word length is comprised of four 72 bit wide chunks, where each chunk contains 64 data bits plus 8 ECC bits. In an alternate embodiment, data array 406 is a 576 Kbyte, 4-way set associative SRAM that is logically organized as a 4×4K×288.

The L2 cache memory allows pipelined read accesses for producing a "seamless data" stream along with mechanisms to allow data line read capability and tag array access capability. If a memory request is made to the L2 cache memory, a read operation occurs. During a read operation to the L2 cache memory, an address is driven on the address bus portion of the backside bus. The address represents a portion of the memory request. The address is latched into address latch 401. The set number portion of the address from bits [15:5] in address latch 401 is used to select a set in the four separate ways. The tag bits for the set in each of the ways are sent to tag comparison logic 403 with the tag bit portion of the address from bits [35:16] in address latch 401. Thus, the memory request is compared with the tag entry at the page location in each of the ways to determine if the information is in the cache. In the embodiment shown, since there are four ways, there are four separate comparisons made. These comparisons occur in parallel to determine if the information requested is stored in the cache.

If one of the tags matches the tag from the address, then there is a hit. If the results of the comparison determine there is a hit, the tag comparison logic 403 outputs a signal to MUX select logic 407 causing MUX select logic 407 to select the page and corresponding cache line in data array 406. The cache line data selected is output to the data output register 408 which latches the data for output onto the data bus portion 420 of the backside bus. Using the critical chunk portion of the address from bits [4:3] in address latch 401, the chunk MUX selection logic 409 selects the desired chunk of data for output onto data bus 420, which is output to the processor. In one embodiment, the L2 cache memory transfers a 32-byte cache line in burst fashion in four chunks, with the critical chunk first. On the other hand, if none of the tags from tag array 402 match the tag portion of the address of the memory request, then there is a miss, which is indicated to the processor using one of the signals 413.

When data is being written into the L2 cache memory due to the L1 cache of the processor writing data back to the L2 cache memory or due to information from system memory being input into the processor, a cache line is sent to the L2 cache memory. In one embodiment, the cache line is 32-bytes. The data is received by chunk write buffer 405 from data bus 420. Since data bus 420 is only 8-bytes wide and the cache line in 32-bytes wide, the data is received into the chunk write buffer one chunk at a time. The write control signals 410 cause the data from data bus 420 to be directed to its designated chunk location in chunk write buffer 405. Once chunk write buffer 405 is filled, write control signals 410 cause the data to be transferred from chunk write buffer 405 into data array 406.

Controlling the L2 Cache Memory

The processor of the present invention controls the functionality of the L2 cache memory, such that the L2 cache memory is a slave on the backside bus. That is, the control of the L2 cache memory is partitioned between the processor and the L2 cache memory in such a way that the processor of the present invention controls and knows what the L2 cache memory is doing (for example, whether the L2 cache memory is transferring data). In one embodiment of the present invention, the processor controls the L2 cache memory using opcodes sent by the processor to the L2 cache memory.

The processor controls the L2 cache memory behavior through micro-operations which provide the functionality needed for all processor micro-operations requiring the L2 cache memory. In one embodiment, these micro-operations are used to perform all write operations to the L2 cache memory. Also, the processor uses these micro-operations to maintain the cache consistency. These micro-operations function within the confines of the interface provided between the processor and the L2 cache memory in order to implement single die control in a multi-die package. A brief description of each micro-operation performed by the L2 cache memory is given below.

L2 Read Inquire: The processor uses this micro-operation to read an entire line from L2 cache memory if the line is resident in the L2 cache memory. The processor sends a complete address to the L2 cache memory. The L2 cache memory examines the specified set number to see if it has the specified tag. The L2 cache memory signals a hit to the processor if a tag match is found and the status of the line is modified, exclusive, or shared. On a hit, the L2 cache memory updates the appropriate LRU field and returns the way information, the value of the status, and the data line in a burst fashion over four cycles to the processor. If the tag did not match, the L2 cache memory returns the way information, status and full line address (tag and set) of the cache line to be replaced. If a miss occurred, the LRU field is not updated, but will be updated when the replacement line is written using the Write Line Update micro-operation.

State Write: The processor may change the status of any given line in the L2 cache memory with this micro-operation. The processor indicates the set address, the way, and the status value to be stored. No tag matching is done on the address and the L2 cache memory LRU field is not modified.

State Read: The processor reads the status of any given line in the L2 cache memory with this micro-operation. The processor indicates the set address and the way to be read. The L2 cache memory returns the status of the specified line. No tag matching is done on the address and the L2 cache memory LRU field is not modified. This operation may be used for testing purposes.

Tag Inquire: This operation prompts the L2 cache memory to determine if it contains a given line. The L2 cache memory examines the specified set number to determine if it has the specified tag. The L2 cache memory then signals a hit to the processor if a tag match is found and the status of the line is something other than invalid (an illegal status encoding will all signal a hit, but will also cause a BERR). The L2 cache memory data array is not accessed and the L2 cache memory LRU field is not modified. This operation may be used in response to a request from a device on the external bus made to determine if data that is desired is currently stored in the cache memory.

Tag Inquire Update: This micro-operation is identical to Tag Inquire, except that the LRU field is updated upon a match.

Tag Array Read: This micro-operation is used to read an entry in the tag array without accessing the data array. The processor provides the set address and the way information.

The L2 cache memory returns the tag status and the full address. The address is returned over the data lines using the natural alignment of the tag. This scheme avoids bi-directionality on the address lines. The L2 cache memory LRU field is not modified.

Data Array Read: This micro-operation is used to read an entry in the data array without accessing the tag array. The processor provides the set address and the way information. The data line is sent back in a burst fashion over a four cycle burst. The L2 cache memory LRU field is not modified. This operation may be used to test the array.

Write Chunk: The processor uses this micro-operation to load a data chunk into the Chunk Write Buffer on the L2 cache memory chip by specifying the chunk number, driving a data word onto the data bus, and signaling the L2 cache memory to write the chunk. This micro-operation can occur independently of any other L2 cache memory operation not involving the data bus. It is the responsibility of the processor to prevent data bus collisions when issuing Write Chunk micro-operations. No data array or tag array accesses are made during this operation and the LRU field is not modified. This operation is used to write a single chunk into the L2 Chunk Write Buffer, which, at a later time, transfers the contents of the Chunk Write Buffer to the L2 cache memory.

Write Line: This micro-operation is used as the final step in writing an entire line into the L2 cache memory. The line to be written is first stored in the L2 cache memory Chunk Write Buffer using the Write chunk micro-operation described above. The processor then uses the Write Line micro-operation along with specifying the tag and set address, the way information, and the status of the line to be written. The entire line contained in the Chunk Write Buffer is then written into the L2 cache memory data array. The tag and the status are written into the tag array and status array, respectively. The Write Line micro-operation may be issued concurrently with the last of the four Write Chunk commands. The LRU field is not modified with this micro-operation.

Write Line Update: This micro-operation is identical to the Write Line with the addition that the LRU field is updated.

The processor sends these micro-operations to the control logic of the L2 cache memory which decodes the micro-operations to control the sequence of outputs and to provide data integrity. The decoding performed produces signals that initiate access cycles. The control block of the L2 cache memory also performs output control. The control logic also includes logic for performing data integrity operations.

The micro-operations operate on the L2 cache memory using the interface provided by the backside bus. One embodiment of the backside bus provides the following L2 cache memory external interface:

| NAME | CLASS | I/O | DESCRIPTION |
|---|---|---|---|
| A[35:3] | Processor Addr | Input | Physical Address presented by the processor to the L2 cache memory. The Address field is only valid when ADS is asserted. For several of the L2 cache memory operations, only subfields of the address field are examined. |
| D[63:0] | Processor Data | IOput | Data is transferred to and from the L2 cache memory over this bidirectional bus. A dead clock is needed to prevent bus contention during direction switching. During certain operations, this bus can contain an address field or control register data, driven by the L2 cache memory. |
| ADS | Processor Cntl | Input | Upon assertion, the AdDress Strobe indicates to the L2 cache memory that a valid microoperation is being requested by the processor. |
| CLK | Processor Cntl | Input | Full frequency Clock sent to the L2 cache memory from the processor. |
| OP[3:0] | Processor Cntl | Input | The L2 cache memory OPeration is encoded in this field. OP is used by L2 cache memory only when ADS is asserted. |
| SW[3:0] | Processor Cntl | Input | The Status Write bits are supplied by the processor on a status update operation. The processor controls the MESI status bits of each tag in the directory array |
| RESET | Processor Cntl | Input | Buffered System RESET pin. |
| WC[1:0] | Processor Cntl | Input | The Write Chunk field encodes into which write chunk buffer location the chunk data should be latched. It is used by the L2 cache memory only when WCVAL is asserted, and is otherwise undefined. |
| WCVAL | Processor Cntl | Input | The Write Chunk VALid indicates to the L2 cache memory that a data chunk is to be stored in its data line buffer register. The chunk number is specified by WC. |
| WO[1:0] | Processor Cntl | Input | The 2-bit Way Out field is an extension of the address field in that it specifies which way is being referenced by the processor in the given operation. |
| HIT | Processor Cntl | Output | HIT. Indicates status information on a line read or tag inquire. |
| WR[1:0] | Processor | Output | The Way Read field provides the processor |

-continued

| NAME | CLASS | I/O | DESCRIPTION |
|---|---|---|---|
| | Cntl | | the way number of the line that is referenced by the current micro-operation. |
| SR[3:0] | Processor Cntl | Output | The Status Read bits of a given line in the L2 cache memory is driven by the L2 cache memory. |
| AP[1:0] | Processor Integrity | Input | Two bits of Address Parity protect each entry in the L2 cache memory tag array. The address is examined for parity correctness on transmission from processor to L2 cache memory. The transmitted parity bits are stored in the tag array. The address parity is interleaved over the field, with AP[1] protecting the odd bits of A, and AP[O] protecting the even bits of A. Parity is odd. |
| DECC[7:0] | Processor Integrity | IOput | The Data Error Checking and Correcting bits are supplied with each data transfer, regardless of direction, and have the same timing as the D bits. These pins are driven with a 1 when the L2 cache memory is driving an address back to the processor. |
| OUTP | Processor Integrity | Input | OUTput Parity, sent to the L2 cache memory from the processor, calculated over Way Out, and Opcode field. |
| WCPAR | Processor Integrity | Input | Write Chunk PARity, sent to L2 cache memory from the processor, calculated over the chunk number specified by WC. |
| BERR | Processor Integrity | Output | The L2 cache memory detected a Storage Error in the tag or status array, and asserts this signal to the processor. If a transmission error from the processor to the L2 cache memory is detected, the BERR signal is asserted to indicate Transmission Error. |
| INP | Processor Integrity | Output | INput Parity, sent to the processor from the L2 cache memory, computed over the Hit/Miss, Way Read, and Storage/Transmission Error signals. |

Through the use of the above signals, the present invention allows access to the L2 cache memory by the processor. However, the L2 cache memory is able to complete the access in any manner. The processor does not need to know how the access is being completed. Because of this partitioning, any L2 cache memory may be designed for use in the computer system of the present invention. Other signals for bond control and testing, as well as for testing the processor, have been omitted to avoid obscuring the present invention.

Note that the processor die includes the control logic for generating the micro-operations and using the interface provided between the L2 cache memory die and the processor die. The processor provides a unilateral control path between the two dice, with only the bi-directional data bus as an exception. In this manner, the partitioning between the two dice allows one of the dice to include the necessary functionality to control the other die(s).

The sequence of operations that are sent to the L2 cache are controlled by the processor. This control logic can make optimal use of the L2 cache memory as it has access to the L1 cache memory, the processor requests and the system bus requests. The logic is designed to provide the highest priority to all processor accesses. These accesses use the address bus and the arrays for a short period of time but then use the data bus to read out the data chunks over four cycles. The control logic can recognize this condition and perform tag inquire instructions to operate in parallel and not require the data bus.

One Embodiment of a Computer System of the Present Invention

Figure 5:
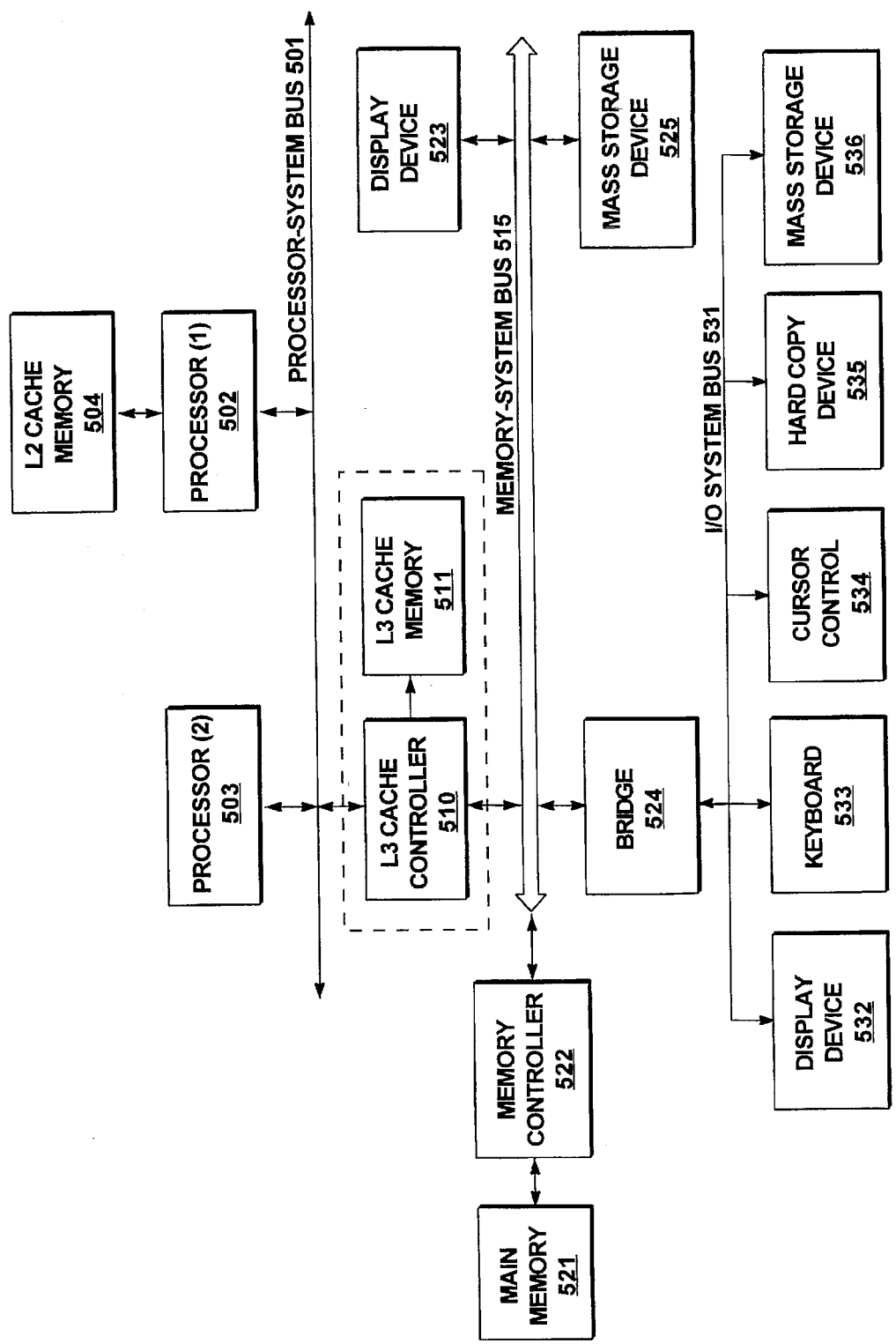
FIG. 5 is an overview of a computer system of the present invention shown in block diagram form.

The processor and the L2 cache memory in the present invention may be integrated into a computer system such as that in FIG. 5. FIG. 5 is an overview of a computer system of the present invention shown in block diagram form. It will be understood that while FIG. 5 is useful for providing an overall description of the computer system of the present invention, a number of details of the system are not shown. As necessary for disclosure of the present invention, further detail is set forth with reference to the other figures provided with this specification.

As illustrated in FIG. 5, a computer system as may be utilized by one embodiment of the present invention generally comprises a processor-system bus or other communication device 501 for communicating information and a processor 502 coupled with processor-system bus 501 for processing information. In the present invention, processor-system bus 501 includes address, data and control buses. In one implementation, the present invention includes Intel® architecture microprocessors as processors 502 and 503; however, the present invention may utilize any type of microprocessor architecture. In one embodiment of the present invention, processor 502 includes an internal cache memory, commonly referred to as a level one (L1) cache memory for temporarily storing data and instructions on-chip. A level two (L2) cache memory 504 is coupled to processor 502 for temporarily storing data and instructions for use by processor 502. In one embodiment, cache memory 504 is included in the same chip package as processor 502.

Also coupled to processor-system bus 501 is processor 503 for processing information in conjunction with processor 502. Processor 503 may comprise a parallel processor, such as a processor similar to or the same as processor 502, or may comprise a co-processor, such as a digital signal processor. A level three (L3) cache memory 511 for temporarily storing data and instructions for use by other devices in the computer system (for example, processor 502, processor 503, etc.) and a L3 cache controller 510 for controlling access to L3 cache memory 511 may also be coupled to processor-system bus 501. The L3 cache controller 510 is also coupled to memory-system bus 515.

A memory-system bus or other communication means 515 for communicating information is coupled to processor 502 for providing processor 502 and other devices in the computer system access to the memory and input/output (I/O) subsystems. A memory controller 522 is coupled with memory-system bus 515 for controlling access to a random access memory (RAM) or other dynamic storage device 521 (commonly referred to as a main memory or system memory) for storing information and instructions for processor 502 (and processor 503). A mass data storage device 525, such as a magnetic disk and disk drive, for storing information and instructions, and a display device 523, such as a cathode ray tube (CRT), liquid crystal display (LCD), etc., for displaying information to the computer user are coupled to memory-system bus 515.

An input/output (I/O) bridge 524 is coupled to memory-system bus 515 and I/O bus 531 to provide a communication path or gateway for devices on either memory-system bus 515 or I/O bus 531 to access or transfer data between devices on the other bus. Specifically, bridge 524 turns the byte/word/dword data transfer traffic from I/O bus 531 into line size traffic on memory-system bus 515.

I/O bus 531 communicates information between devices in the computer system. Devices that may be coupled to system bus 531 include a display device 532, such as a cathode ray tube, liquid crystal display, etc., an alphanumeric input device 533 including alphanumeric and other keys, etc., for communicating information and command selections to other devices in the computer system (for example, processor 502) and a cursor control device 534 for controlling cursor movement. Moreover, a hard copy device 535, such as a plotter or printer, for providing a visual representation of the computer images and a mass storage device 536, such as a magnetic disk and disk drive, for storing information and instructions may also be coupled to system bus 531.

Of course, certain implementations and uses of the present invention may not require nor include all of the above components. For example, in certain implementations, the L3 cache controller and L3 cache memory may not be required. In such implementations processors 502 and 503 will reside directly on a memory system bus 515. In other implementations, it may not be required to provide a display device for displaying information. In addition, certain implementations of the present invention may include other components.

Responding to Write Requests

Figure 6:
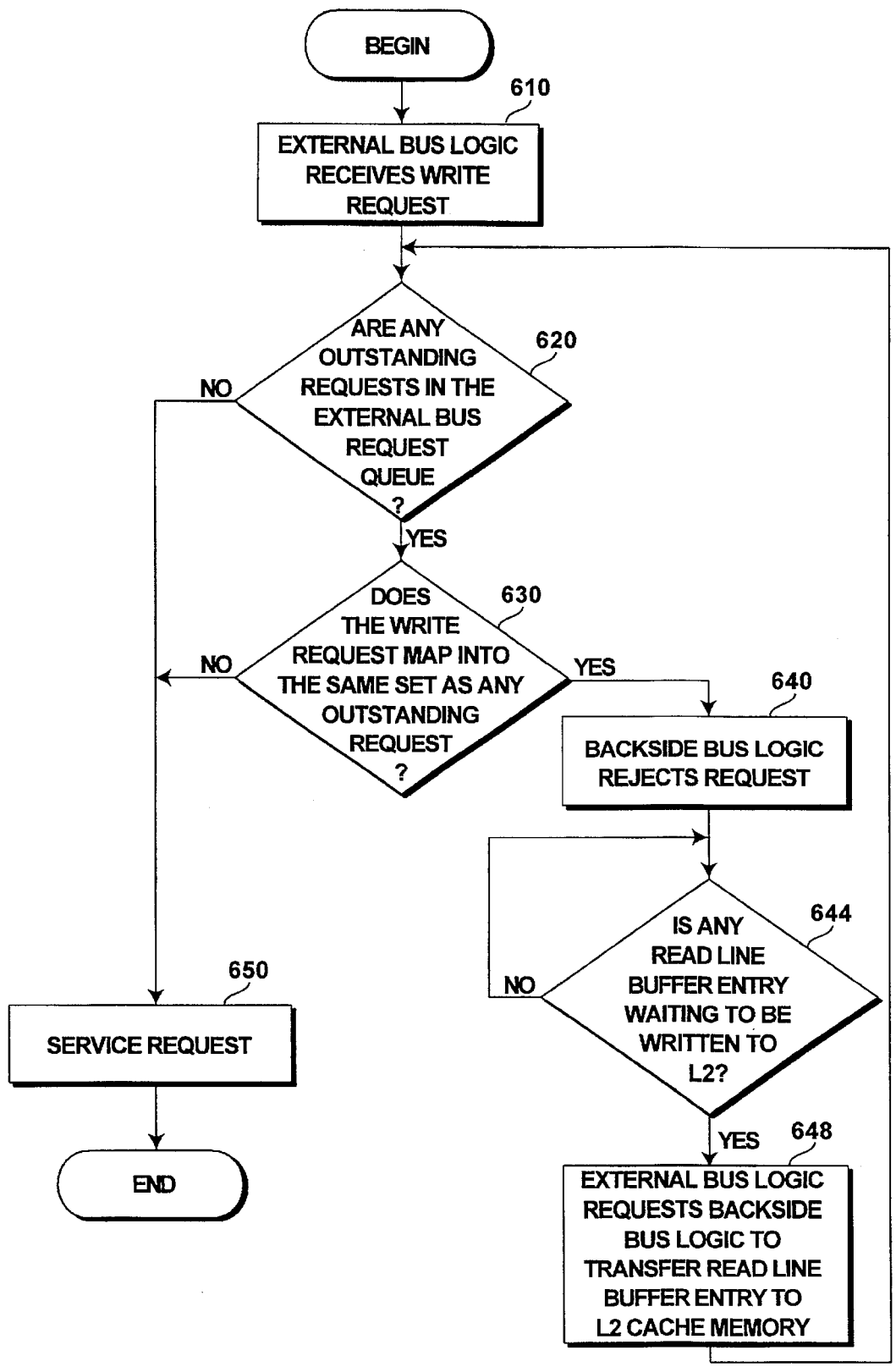
FIG. 6 is a flowchart showing the steps followed by a cache memory subsystem in responding to write requests in one embodiment of the present invention.

FIG. 6 is a flowchart showing the steps followed by a cache memory subsystem in responding to write requests in one embodiment of the present invention. A write request is first received by the external bus logic, step 610. In one embodiment of the present invention, this write request is received from the data cache unit, which is requesting to return a victimized cache line to the L2 cache memory. The write request to the cache memory includes both a memory address and its associated data. This memory address is the address in the system memory for the associated data. The address is also used to determine which set in the cache memory the data should be written into.

The write request propagates to the top of the backside queue, at which time the external bus logic checks whether any requests are currently outstanding in the external bus request queue, step 620. As discussed above with reference to FIG. 2, the external bus request queue monitors currently outstanding requests from the external bus logic to the main system memory. These outstanding requests could include, for example, a write-back request where the cache memory is writing a cache line to the system memory, or a fetch request, where the cache memory is retrieving a data line from the system memory. Thus, control logic within the external bus request queue is able to check whether any requests are currently outstanding. In one embodiment of the present invention, this is done by checking whether any of the transaction queue entries are valid.

If no requests are currently outstanding, then the request is serviced, step 650. Servicing the request means that the backside bus logic accepts and performs as much of the request as possible. For a write request, the external bus logic transfers the data associated with the request to the backside bus logic, where it is temporarily stored in the read line buffer. The backside bus logic then transfers that data to the proper set of the cache memory.

Prior to storing the data in the cache memory, the backside bus logic checks whether the set this data is to be written into contains this cache line (that is, whether this request hits the cache memory). If the set does contain the cache line, then the cache line in the L2 cache memory is replaced by the data associated with this write request. However, if the L2 cache memory does not contain the cache line, then the backside bus logic transfers the write request to the system memory via the external bus logic, bypassing the L2 cache.

Returning to step 620, if there is an outstanding request, then the external bus request queue determines whether the write request maps into the same set of the cache memory as any of the outstanding requests, step 630. This determination is made by the control logic within the external bus request queue. The control logic checks the set the write request maps into against the set information of each address in the external bus request queue. Thus, control logic within the external bus request queue is able to quickly compare the set information for the write request to those outstanding requests in the queue and determine whether a conflict exists. In an alternate embodiment, the control logic checks the entire address information in step 620, rather than just the set information. Thus, a conflict exists only if two addresses match.

In one embodiment of the present invention, the control logic checks the set information of only the addresses in the transaction queue of the external bus request queue in step 620. That is, the set information of addresses in the L2 dirty victim address buffer of the external bus request queue are not checked in step 620.

The existence of a match indicates to the control logic that a request is currently outstanding which may affect the data stored in this set. For example, a fetch request may currently be outstanding which will retrieve data into this set from the system memory. Thus, in order to maintain cache consistency, the write request is rejected.

In one embodiment of the present invention, the backside bus logic rejects the request when the write request maps into the same set as an outstanding request, step 640. In one embodiment of the present invention, this rejection causes the write request to be placed at the bottom of the backside queue. Alternatively, the write request may be placed in another position of the backside queue, such as one back from the top of the queue. The external bus request queue then checks whether any read line buffer entry is waiting to be written to the L2 cache memory, step 644. This checking is continued until an entry is waiting in the read line buffer. Once an entry is in the read line buffer, the external bus request queue issues a signal to the backside bus logic requesting that the backside bus logic transfer one entry in the read line buffer to the L2 cache memory, step 648. In one implementation, this is accomplished by removing and processing a transaction from the backside queue in the external bus logic.

After this transfer of an entry in the read line buffer is completed, steps 620 through 648 are repeated until the conflict between the write request and the outstanding request(s) no longer exists. During this process of FIG. 6, additional requests in the external bus request queue may receive responses. For example, a data line may be fetched from system memory and stored in the read line buffer. Thus, eventually, the currently outstanding request which conflicts with the write request will be transferred to the L2 cache memory, and thereby no longer conflict.

Thus, the write request is rejected or "blocked" by the cache memory subsystem until the conflict between the write request and the outstanding request is resolved. Note that subsequent requests may also be received by the external bus logic while this write request is being blocked. Whether the subsequent requests are serviced or blocked is dependent on the individual addresses of the requests, according to the steps of FIGS. 6 and 7.

In an alternate embodiment of the present invention, the external bus logic requests the backside bus logic to transfer all the data in the read line buffer to the L2 cache memory in step 648. Thus, rather than transferring data for a single request, the backside bus logic transfers all of the data in the read line buffer.

In one implementation of the present invention, upon receiving the rejection, the external bus request queue places the rejected request at the end of the backside queue. The external bus request queue then issues a request to the backside bus logic to perform the transactions in the backside queue. Eventually, the rejected write request propagates to the top of the queue and is attempted by the backside bus logic again. The external bus request queue performs another comparison at this time, again checking whether the write request set information matches any currently outstanding request. If a match exists, then the process is repeated again.

In an alternate embodiment, the rejection indication is returned to the requesting agent. In this embodiment, the request is removed from the external bus logic and the requesting agent is responsible for re-trying the request at a later time. How and when the requesting agent retries the request is dependent on the requesting agent. For example, the requesting agent may halt its operation until the cache backside bus logic accepts the request. Alternatively, the requesting agent may continue processing other instructions and attempt this request at a later time.

Responding to Read Requests

Figure 7:
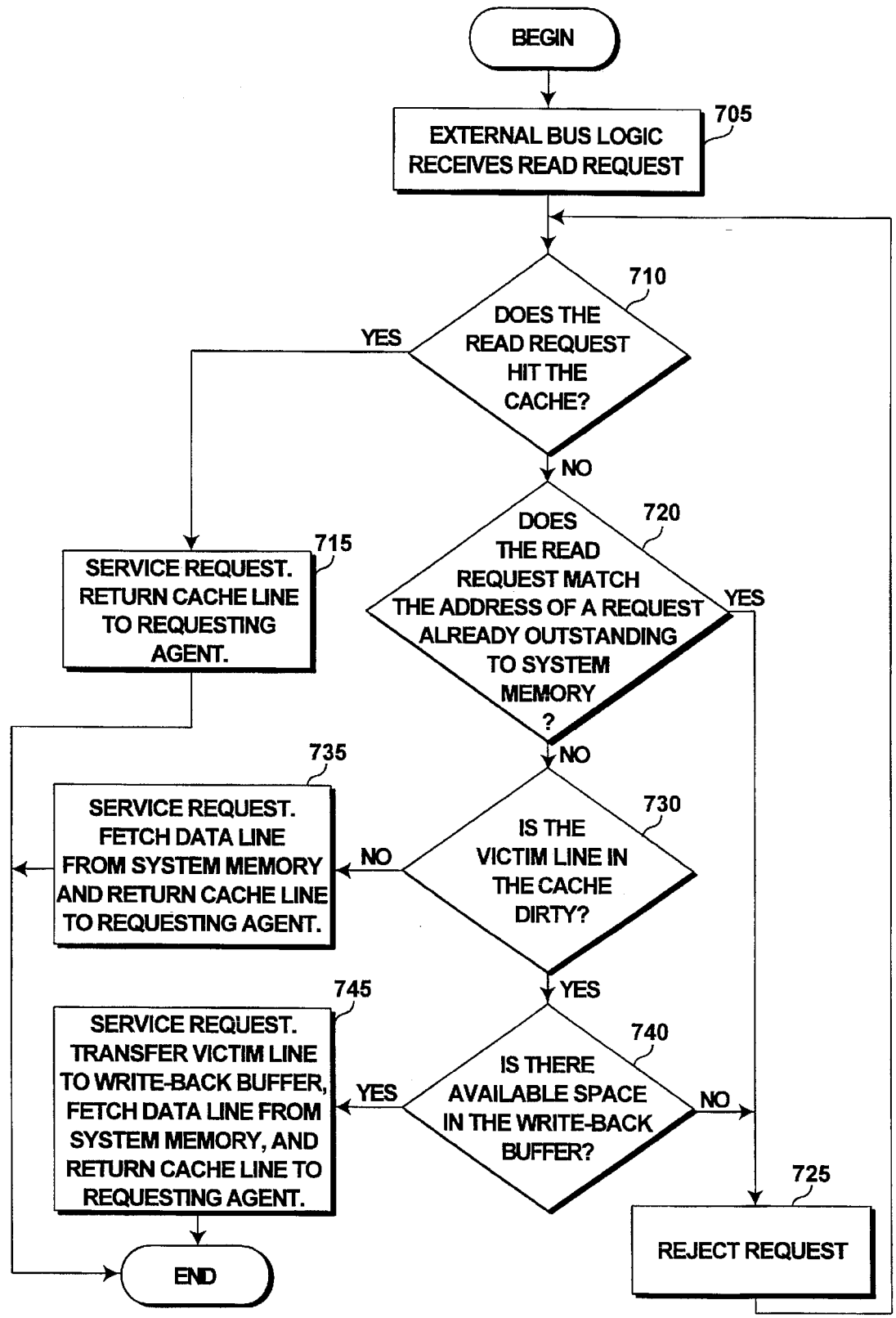
FIG. 7 is a flowchart showing the steps followed by a cache memory subsystem in responding to read requests in one embodiment of the present invention.

FIG. 7 is a flowchart showing the steps followed by a cache memory subsystem in responding to read requests in one embodiment of the present invention. A read request is first received by the external bus logic, step 705, from a requesting agent. In one embodiment of the present invention, this requesting agent is a data cache unit memory. Alternatively, the requesting agent may be an instruction fetch unit. Regardless of the source of the request, the request is received by the external bus logic. The read request includes a memory address where the requested data is stored in the system memory. This address is also used to determine which set in the cache memory the data should be read from.

Upon receiving the request, the external bus logic forwards the request to the backside bus logic via the backside queue within the external bus logic. The backside bus logic then checks whether the request hits the L2 cache memory, step 710. If the request hits the cache, then the backside bus logic services the request, step 715. As discussed above, servicing the request means that the backside bus logic accepts the request and performs it. If the request hits the cache, then the request is serviced by returning the cache line to the requesting agent, step 715.

If, however, the request misses the cache, then the backside bus logic issues a "miss" signal to the external bus logic. This indicates to the external bus logic that it must perform additional tasks to retrieve the data from the system memory. The additional tasks to be performed are determined based on whether the victim line in the L2 cache is dirty, and/or whether there is available space in the write-back buffer.

If the request misses the L2 cache, then the external bus logic determines whether the requested address is the same address as any currently outstanding request to the system memory, step 720. In one embodiment of the present invention, this determination is made by control logic within the external bus request queue. The control logic checks the address of the read request against the addresses of the currently outstanding requests. In one implementation, the control logic checks only those requests which are in the transaction queue of the external bus request queue.

If the external bus logic finds a matching outstanding address in step 720, then the request is rejected, step 725. The handling of a rejection is as discussed above with reference to FIG. 6. That is, the external bus logic requests the backside bus logic to transfer a read line buffer entry to the L2 cache memory, then attempts the request again once a read line buffer entry is transferred. Analogous to the discussion in FIG. 6, the external bus logic blocks this read request until the request no longer matches the address of a request already outstanding to system memory.

Returning to step 720, if the external bus logic does not find a matching outstanding address in step 720, then the read request does not conflict with any currently outstanding requests. The backside bus logic next checks whether the victim line in the cache is dirty, step 730. The victim line is in a dirty state if it has been modified in the cache and that modification has not been made in the system memory. Thus, a dirty victim line cannot simply be overwritten; doing so would result in the loss of modifications made to the cache line. In one embodiment of the present invention, the L2 cache memory returns the victim line address and the state of that line to the backside bus logic when a request misses the L2 cache.

If the victim line in the L2 cache is not in a dirty state, then the backside bus logic services the request, step 735. In this situation, servicing means issuing a signal to the external bus logic to retrieve the data from the system memory. The data is then transferred by the external bus logic to the read line buffer of the backside bus logic. A request to transfer that data to the L2 cache memory is then placed in the backside bus queue by the external bus request queue.

Returning to step 730, if the victim line is in a dirty state, then the backside bus control logic checks whether there is available space in the write-back buffer, step 740. The victim line cannot be simply overwritten because it is in a dirty state. If space is available in the write-back buffer, then the backside bus logic services the request, step 745. Under these circumstances, servicing the request includes transferring the victim line to the write-back buffer (and subsequently to the system memory), fetching the requested data line from the system memory, returning the data line to the requesting agent, and storing the data line in the proper set in the cache memory.

In step 740, however, if the cache controller determines that no space is available in the write-back buffer, the read request is rejected, step 725. The request is rejected because the request missed the cache and must be retrieved from the system memory; however, the victim line is dirty and no space exists in the write-back buffer to temporarily store the victim line. In one embodiment, the external bus logic transfers an entry in the write-back buffer to the system memory in response to the rejection and repeats steps 710 through 740. Alternatively, the external bus logic may repeat the check at step 740 until space becomes available.

Thus, the cache memory of the present invention blocks requests received from a requesting agent only under special circumstances. If these special circumstances are met, then the present invention temporarily blocks that particular request until the circumstances are no longer met. However, the cache memory continues to service other requests received from requesting agents, unless the other requests also meet those special circumstances. Therefore, the cache memory of the present invention supports requesting agents, such as microprocessors, efficiently by increasing the access those agents have to the cache memory.

It will be appreciated that although the descriptions above describe the cache memory with reduced request-blocking as being an L2 cache memory, other cache memories are within the spirit and scope of the present invention. For example, the reduced request-blocking method of the present invention may be employed in a level-1 cache memory, or a level-3 cache memory.

Furthermore, it should be noted that although the above descriptions describe a cache memory subsystem comprising both an external bus logic unit and a backside bus logic unit, the present invention is not limited to such a configuration. It will be appreciated that a wide variety of cache memory subsystems may implement the teachings of the present invention, and such subsystems are within the spirit and scope of the present invention.

Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims, which in themselves recite only those features regarded as essential to the invention.

Thus, a cache memory with reduced request-blocking has been described.

What is claimed is:

1. In a memory subsystem, a method of responding to a first request to a cache memory, the method comprising the steps of:

(a) determining whether the first request misses the cache memory;

(b) determining whether the first request conflicts with a second request received by the cache memory prior to the first request, provided the first request misses the cache memory, wherein the second request missed the cache memory; and (c) servicing the first request, provided the first request either hits the cache memory or does not conflict with the second request, otherwise rejecting the first request.

2. The method of claim 1, wherein said step (b) comprises the step of determining whether the first request and the second request are requests to the same memory address.

3. The method of claim 1, wherein said step (c) comprises the steps of:

determining a victim line in the cache memory;

checking whether the victim line in the cache memory is in a dirty state;

copying a data line from a main system memory corresponding to the first request into the cache memory location occupied by the victim line, provided the victim line is not in the dirty state; and returning the cache line corresponding to the first request to a requesting agent, provided the victim line is not in the dirty state.

4. The method of claim 1, further comprising the steps of:

determining a victim line in the cache memory;

checking whether the victim line in the cache memory is in a dirty state; and checking whether a write-back buffer is full, provided the victim line is in the dirty state.

5. The method of claim 4, wherein said step (c) comprises the step of returning a cache line corresponding to the first request to a requesting agent, provided space is available in the write-back buffer.

6. The method of claim 1, further comprising the step of repeating steps (b) and (c) until said first request no longer conflicts with said second request.

7. The method of claim 1, wherein the first request is a read request.

8. The method of claim 1, wherein the first request originates with a microprocessor coupled to the cache memory subsystem.

9. A method in a memory subsystem of responding to a first request from a first requesting agent targeting a cache memory of the memory subsystem, the method comprising the steps of:

(a) determining whether a second request was received by the cache memory from a second requesting agent prior to the first request, wherein the cache memory has not yet returned data corresponding to the second request to the second requesting agent;

(b) checking whether the first request and the second request map into the same set in the cache memory, provided the cache memory has not yet returned the data corresponding to the second request to the second requesting agent; and (c) blocking said first request if the first request and the second request map into the same set in the cache memory.

10. The method of claim 9, wherein said first request is a write request.

11. The method of claim 9, wherein said first requesting agent and said second requesting agent are the same agents.

12. The method of claim 9, further comprising repeating steps (a) through (c) until the first request no longer maps into the same set in the cache memory as the second request.

13. A memory subsystem comprising:

a cache memory including a plurality of cache memory locations;

a write-back buffer which temporarily stores data from a cache memory location of said plurality of cache memory locations which is being written back to a main system memory;

a cache control logic coupled to the cache memory and the write-back buffer;

comparison logic coupled to the cache control logic configured to compare a first request received by the memory subsystem with a second request which the cache control logic is in the process of servicing, and to determine whether the first request conflicts with the second request; and wherein the cache control logic is configured to service the first request if the first request either hits the cache memory or does not conflict with the second request, and configured to otherwise block the first request.

14. The memory subsystem of claim 13, wherein the comparison logic includes address comparison logic which compares the addresses of the first request and the second request.

15. The memory subsystem of claim 14, wherein the cache control logic rejects the first request when the address of the first request and the second request match.

16. The memory subsystem of claim 13, wherein the comparison logic includes set comparison logic which compares the set corresponding to the first request with the set corresponding to the second request.

17. The cache memory subsystem of claim 13, wherein said write-back buffer comprises temporary storage for a plurality of requests being serviced by the cache memory subsystem.

18. A memory subsystem comprising:

a cache memory including a plurality of cache memory locations;

a write-back buffer which temporarily stores data from a cache memory location of said plurality of cache memory locations which is being written back to a main system memory;

first cache control logic coupled to the cache memory for returning a cache line to an agent which requested the cache line;

second cache control logic coupled to the write-back buffer and the cache memory for rejecting a request;

comparison logic coupled to the second cache control logic which compares a first request received by the memory subsystem with a second request which the second cache control logic is in the process of servicing, wherein the comparison logic includes set comparison logic which compares the set corresponding to the first request with the set corresponding to the second request; and wherein said second cache control logic rejects the first request when the cache memory set that the first request maps into matches the cache memory set that the second request maps into.

19. A computer system comprising:

a bus;

a processor coupled to the bus;

a system memory coupled to the bus;

a cache memory coupled to the processor including a plurality of cache memory locations; and a cache memory controller, coupled to the processor, including, a write-back buffer which temporarily stores data from a cache memory location of said plurality of cache memory locations which is being written back to a main system memory, a cache control logic coupled to the write-back buffer;

comparison logic coupled to the cache control logic configured to compare a first request received by the cache memory controller with a second request which the cache control logic is in the process of servicing and to determine whether the first request conflicts with the second request, and wherein the cache control logic is configured to service the first request if the first request either hits the cache memory or does not conflict with the second request, and configured to otherwise reject the first request.

20. The system of claim 19, wherein said comparison logic includes address comparison logic which compares the address of the first request and the second request.

21. The system of claim 20, wherein the cache control logic rejects said first request when the address of the first request and the second request match.

22. The system of claim 19, wherein said comparison logic includes set comparison logic which compares the set corresponding to the first request with the set corresponding to the second request.

23. A computer system comprising:

a bus;

a processor coupled to the bus;

a system memory coupled to the bus;

a cache memory coupled to the processor including a plurality of cache memory locations; and a cache memory controller, including, a write-back buffer which temporarily stores data from a cache memory location of said plurality of cache memory locations which is being written back to a main system memory, first cache control logic coupled to the cache memory for returning a cache line to an agent which requested the cache line, second cache control logic coupled to the write-back buffer and the cache memory for rejecting a request, comparison logic coupled to the second cache control logic which compares a first request received by the cache memory controller with a second request which the second cache control logic is in the process of servicing, wherein the comparison logic includes set comparison logic which compares the set corresponding to the first request with the set corresponding to the second request; and wherein said second cache control logic rejects the first request when the cache memory set that the first request maps into matches the cache memory set that the second request maps into.

* * * * *